Patented Dec. 31, 1935

2,025,954

UNITED STATES PATENT OFFICE 2,025,954

DENATURANT FOR FATS AND FATTY OILS

John E. Muth, Berkeley, Calif., assignor to Standard Oil Company of California, San Francisco, Calif., a corporation of Delaware No Drawing. Application July 18, 1933,
Serial No. 680,984

20 Claims. (Cl. 87—12)

This invention relates to a process for denaturing animal and vegetable fats and fatty oils, and refers to the fats and oils denatured in the practice of the process.

In particular, the invention relates to the use of certain ethers of the relatively low molecular weight carbohydrates and to the use of the benzyl derivatives of certain lower polyhydric alcohols as denaturing agents of this class.

For the purposes of the arts and industries it is often desirable to render animal and vegetable fats and fatty oils permanently ined.ble. To be suitable for this purpose, a denaturing agent should possess certain obvious but often difficultly attainable qualifications, namely: it should be sufficiently oil- and fat-soluble to remain in permanent solution; it should not be sufficiently water-soluble to allow extraction by digestion of boiling water; it should not be volatile with steam, even upon subjection to steaming for considerable periods of time; it should possess such a marked, persistent and objectionable taste as to render the materials to which is is added positively unpalatable and inedible, even when present in very small quantities.

I have found that the benzyl derivatives of the monosaccharides (of which glucose is an example) and of the di-saccharides (of which sucrose is an example), and the benzyl derivatives of certain di-hydroxy-, tri-hydroxy- and poly-hydroxy-alcohols (of which tri-ethylene glycol, glycerol and mannitol are examples, respectively) possess all of the numerous qualifications listed above as requisite in a satisfactory denaturing material of this class.

Examples of the practice of the process of my invention, setting forth the manner of preparing my denaturing agents and describing the character of the fats and fatty oils denatured by their use, follow:

The benzyl derivatives of the mono-, di-saccharides and of the poly-hydroxy alcohols may be prepared by eliminating the chlorine of benzyl chloride and the hydrogen of one or more of the hydroxy groups of the saccharide or the poly-hydroxy alcohol, as hydrochloric acid, which is absorbed by a base such as sodium hydroxide; the saccharide or poly-hydroxy alcohol and one or more benzyl radicals combine to form an ether.

Thus, 25 parts by weight of sucrose are dissolved in a 10% sodium hydroxide solution containing 33.5 parts of sodium hydroxide; 80 parts by weight of benzyl chloride are added, and the mixture is boiled under a reflux condenser for about 5 hours. After this period the benzyl sucrose layer is separated from the water layer.

If a highly benzylated product is desired, the benzyl sucrose layer as obtained above is again boiled for about 5 hours, again with refluxing, with fresh 10% sodium hydroxide solution and benzyl chloride, each in the amount used in the first digestion. The highly benzylated sucrose is now separated from the water layer and the impurities present, such as unreacted benzyl chloride and benzyl alcohol (the latter present by hydrolysis of part of the benzyl chloride) are removed by blowing with steam for several hours.

A highly benzylated sucrose prepared in this manner, which I shall identify as prepared by repeated digestion of sucrose with benzyl chloride in the presence of an alkali, is more than sufficiently oil-soluble to remain in permanent solution in a fat or fatty oil in the amounts required to denature it. The substance is so intensely bitter to the taste that when added to a palatable fat or oil in amounts as low as 1 part by weight to 200 to 600 parts of fat or oil, the treated fat or oil is so positively unpalatable as to be inedible.

I have found, however, that as benzylation of the mono- and di-saccharides increases, that is, as the number of benzyl groups added to the glucose or sucrose molecule increases, oil-solubility increases but bitterness decreases. Taking advantage of the increased bitterness of the lower benzylated derivatives, I have provided sufficient oil-solubility for the purposes of my invention by slightly modifying the manner of preparation described above.

A single digestion of sucrose with benzyl chloride in the presence of sodium hydroxide, in the amounts and in the manner described above, produces a mixture of the lower benzylated derivatives which is considerably less oil-soluble than those derivatives prepared by repeated digestion; however, these lower derivatives possess a more intense bitterness and hence are preferable for the practice of my invention. I have found that by omitting the step of blowing the crude benzyl derivatives with steam after such a single digestion, that is, by allowing such benzyl alcohol as is formed by hydrolysis, to remain, the resulting product is sufficiently oil-soluble for the practice of my invention. Moreover, since ordinarily technical benzyl chloride contains appreciable quantities of toluene as an impurity, which serves also to render the lower benzyl saccharides more soluble in oil, I prefer crude to purified benzyl chloride in the practice of my invention. I thus obtain a lower benzyl derivative of a mono- or di-saccharide which is possessed of the most intense bitterness and which, by reason of the presence of benzyl alcohol and of toluene and perhaps lesser amounts of other impurities, is more easily soluble in oil than is the pure benzylated derivatives itself.

In any case, before dilution or addition to the material to be denatured the product should be washed for the removal of water-soluble matter, and dried.

When prepared in this manner, a di-benzyl sucrose is preferable to a penta-benzyl sucrose, by reason of its more intense bitterness.

Benzyl derivatives of the mono-saccharides, for example, glucose, may be prepared in a manner similar to that described above for the preparation of benzyl derivatives of sucrose.

As noted above these substances, when added to animal or vegetable fats and fatty oils to denature them, are not removable by digestion with boiling water and are not volatilized by blowing with steam.

These benzyl ethers are very viscous liquids, and for many purposes it is desirable to dilute them with a diluent before their addition to the fat or oil to be denatured. For such purposes a mineral oil or an extract containing the aromatic and unsaturated constitutents of a mineral oil, such as an Edeleanu extract of a petroleum lamp oil or light lubricating oil, is satisfactory. For example, a mixture of 30 parts by weight of a crude benzyl sucrose, prepared by a single digestion of sucrose with benzyl chloride, as described above (consisting largely of di-benzyl sucrose and containing such benzyl alcohol as is produced in the reaction and such toluene as was originally present as impurity in the technical benzyl chloride), may be diluted with 70 parts of an Edeleanu extract from a lamp oil distillate; such a mixture, when added to a fat or oil in the proportions of 1 part to 200, by weight, satisfactorily passes all government tests for a denaturing substance of this class.

The benzyl derivatives of mono-saccharides other than glucose, such for example as those of galactose and levulose, are suitable in the practice of the invention. Also, the benzyl derivatives of di-saccharides other than sucrose, such for example as those of maltose and lactose, are suitable. As noted above, the bitterness of the benzyl derivatives of these saccharides decreases as benzylation increases, and hence the lower derivatives are preferable.

Benzyl derivatives of di-, tri- and poly-hydroxy alcohols, suitable for use as denaturing agents for fats and oils, may be prepared in a manner analogous to that described above.

For example, 25 parts by weight of mannitol, a poly-hydroxy alcohol, and 18 parts by weight of sodium hydroxide are dissolved in 180 parts of water. To this solution 51 parts by weight of benzyl chloride are added and the mixture is refluxed, with stirring, for about 5 hours. The benzyl mannitol is then separated by decantation from the water layer, on which it floats. After washing and drying, this material may be used as such as a denaturing agent, or the benzyl alcohol, benzyl ether and other by-products of the reaction may be removed by blowing the crude product with steam.

Such a benzyl derivative of mannitol may be used as a denaturant without dilution; for many purposes, however, particularly in order to provide a denaturant of standard or regulable intensity of taste, and also because of the high viscosity of the benzyl derivatives themselves, I prefer to dilute it with a diluent such as a mineral oil or an Edeleanu extract of a mineral oil, and in such an event I have found that a mixture of 20 parts by weight of the crude product with 80 parts by weight of an Edeleanu extract of a lamp oil distillate will pass all government fat denaturant tests when added to a fat or oil in the proportions of 1 part to 200 or more of fat or fatty oil.

The benzyl derivatives of glycerol, a tri-hydroxy alcohol, and of tri-ethylene glycol, a di-hydroxy alcohol, are also intensely bitter in taste, and are eminently suitable for use as denaturing agents of this class. These compounds, however, are slightly more volatile than the benzyl derivatives of glucose, sucrose and mannitol, specifically exemplified above, and hence will not remain as completely in a denatured fat or oil upon steaming for long periods of time. These compounds are prepared in a manner exactly similar to that described above, changes in proportions only of the reacting substances, in accordance with the molecular weights of the saccharides or poly-hydroxy alcohols, being required.

I have found that the benzyl derivatives of the starches, such as those of dextrine, and the benzyl derivatives of such higher carbohydrates as cellulose are either sweet to the taste or are not sufficiently bitter to be satisfactory denaturing agents of this class.

While I have described in detail the character of my invention and given numerous illustrative examples of its practice, I have done so by way of illustration only and with the intention that no limitation should be imposed upon the invention thereby.

I claim:

1. A composition of matter consisting of a fat or oil containing a benzyl derivative of a saccharide.

2. A composition of matter consisting of a fat or oil containing a benzyl derivative of a mono-saccharide.

3. A composition of matter consisting of a fat or oil containing a benzyl derivative of glucose.

4. A composition of matter consisting of a fat or oil containing a benzyl derivative of a di-saccharide.

5. A composition of matter consisting of a fat or oil containing a benzyl derivative of sucrose.

6. A composition of matter consisting of a fat or oil containing a benzyl derivative of a poly-hydroxy alcohol.

7. A composition of matter consisting of a fat or oil containing a benzyl derivative of mannitol.

8. A composition of matter consisting of a fat or oil containing a benzyl derivative of glycerol.

9. A composition of matter consisting of a fat or oil containing a benzyl derivative of tri-ethylene glycol.

10. A denaturing material for rendering fats and oils inedible, comprising a benzyl derivative of a saccharide.

11. A denaturing material for rendering fats and oils inedible, comprising a benzyl derivative of a mono-saccharide.

12. A denaturing material for rendering fats and oils inedible, comprising a benzyl derivative of glucose.

13. A denaturing material for rendering fats and oils inedible, comprising a benzyl derivative of a di-saccharide.

14. A denaturing material for rendering fats and oils inedible, comprising a benzyl derivative of sucrose.

15. A denaturing material for rendering fats and oils inedible, comprising a benzyl ether of a poly-hydroxy alcohol.

16. A denaturing material for rendering fats and oils inedible, comprising a benzyl ether of mannitol.

17. A denaturing material for rendering fats and oils inedible, comprising a benzyl ether of glycerol.

18. A denaturing material for rendering fats and oils inedible, comprising a benzyl ether of tri-ethylene glycol.

19. A denaturing material for rendering fats and oils inedible, comprising a benzyl derivative of a saccharide and a diluent of the class consisting of mineral oils, Edeleanu extracts of mineral oils, benzyl alcohol and toluene.

20. A denaturing material for rendering fats and oils inedible, comprising a di-benzyl sucrose.

JOHN E. MUTH.